UNITED STATES PATENT OFFICE.

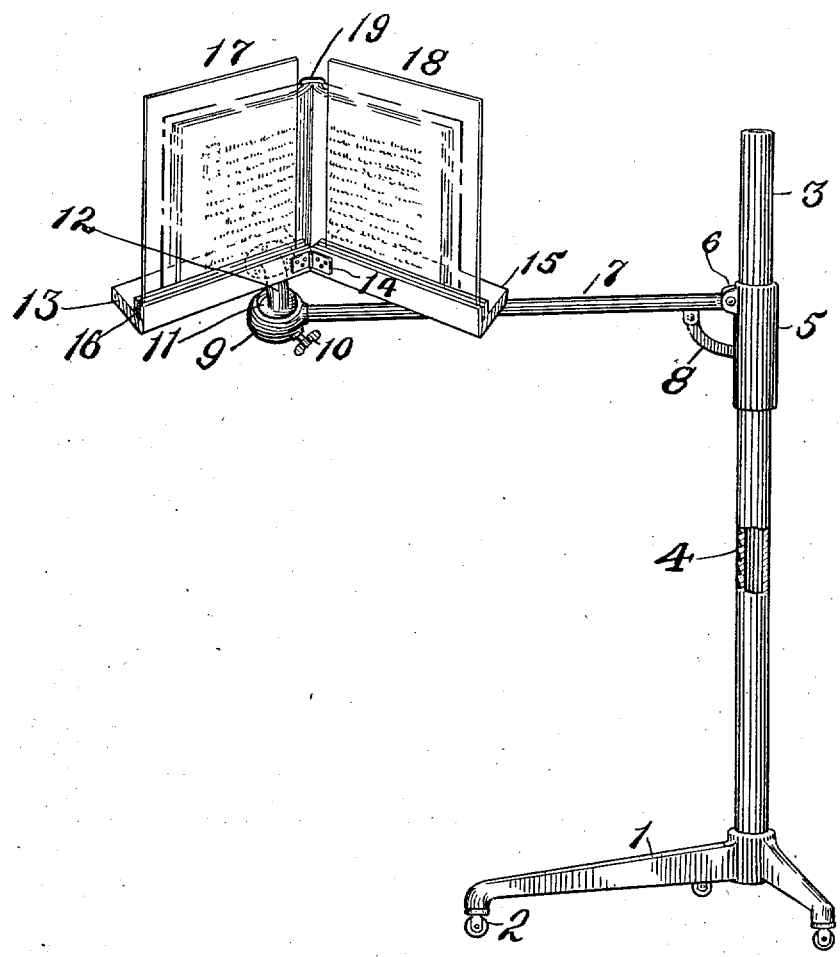

MARK D. STEVENSON, OF AKRON, OHIO.

TRANSPARENT BOOK-SUPPORT.

1,017,698.      Specification of Letters Patent.      Patented Feb. 20, 1912.

Application filed March 8, 1911. Serial No. 613,067.

*To all whom it may concern:*

Be it known that I, MARK D. STEVENSON, a citizen of the United States, residing at Akron, in the county of Summit and State of Ohio, have invented new and useful Improvements in Transparent Book-Supports, of which the following is a specification.

This invention relates to supports for reading matter, such as books, etc., wherein the instrumentality containing the reading matter is supported in its open position by means of a transparent member through which the reading matter is exposed.

Heretofore, reading or studying while in a recumbent position, has been somewhat generally discouraged and condemned for various reasons, among which are, the attendant exhaustion produced by the effort of the person in holding the reading matter; the danger of holding the reading matter at the wrong inclination so as to cause an undue and unnatural strain on the eyes; holding the reading matter too close or at too great a distance from the eyes, and others not necessary to mention.

From my extended personal and professional experience I have found that the best results are obtained from reading or studying while the person or patient is in a recumbent position and consequently, in a relaxed condition, such as is assured when the reader is in bed for instance, but, the supporting of the reading matter in a proper position for reading is at all times a tiresome and somewhat exhausting operation and does not permit the reader that proper and necessary relaxation which is accompanied by the best results, the reader being at all times under a certain strain which in the majority of cases prevents perfect relaxation.

I have not been able to find any support or holder for printed matter which will support efficiently any inverted reading matter, and permit it to be plainly seen and be firmly held in a proper position for the eyes, and with the lines of the reading matter properly alined with respect to the line of vision.

Hence, the object of this invention is to construct a support for reading matter such as books, magazines, news-papers, letters, etc., properly and efficiently in substantially any position suited to the requirements and wishes of the reader, whether reclining in a chair or lying flat on the back, the support being such that the reading matter may be clearly seen through the support in reading and still leave the former free to be manipulated by the reader, as in the act of turning the pages.

With the foregoing and other objects in view, the invention consists in the novel construction, combination and arrangement of parts constituting the invention to be hereinafter specifically described and illustrated in the accompanying drawing which forms a part hereof, wherein is shown the preferred embodiment of the invention, but it is to be understood that changes, variations and modifications can be resorted to which come within the scope of the claims hereunto appended.

The drawing presented is a perspective view of a book support embodying this invention, showing a book in position thereon.

Referring to the type of book-holder shown in the drawing, the reference numeral 1 denotes a base, provided, if desired, with casters or rollers 2, from which extends upwardly a rod 3 which may be tubular if necessary, to reduce weight, and may be provided with a groove, having ratchet teeth 4 therein. Mounted on the rod 3 is a sleeve 5 provided with a pair of ears 6 to which is pivotally connected an arm 7. Pivotally secured to the arm 7 is a pawl or detent 8 engaging the teeth 4 for holding the sleeve 5 at any desired point while permitting the same to be easily raised or lowered at will. Secured to the outer end of the arm 7 is a socket 9 provided preferably with a spherical recess, into which extends a set screw 10.

Mounted in the spherical recess 9 is the ball-shaped end 11 of an arm 12, to constitute between the members 9 and 11 a universal or ball and socket joint, the ball being held against movement by means of the set screws 10. Secured to the arm 12 is a member 13 to which is secured by means of a hinge 14, a similar member 15. The members 13 and 15 constitute racks for a purpose to be later described, and each of them is provided with some means such as an upwardly-extending flange provided with a groove 16, in which are firmly set panes of transparent glass 17 and 18. The main portions of the racks 13 and 15 are normally horizontal and project rearwardly from the portions which contain the grooves 16 and serve to support the reading matter which in this case is illustrated as a book 19 so that when the book is opened and seated on the racks 13 and 15, the leaves are held apart at any point and rest on the rear faces of the panes of glass or other transparent material which serve to support the book and permit the easy reading of the printed matter contained thereon through the panes of glass 17 and 18. In practice, the hinge 14 will be so constructed as to offer considerable resistance to the movement of the members 13 and 15 with respect to each other so that they will be held frictionally in a fixed position.

It will be noted that the panes 17 and 18 are preferably slightly separated from each other and thereby permit the members 13 and 15 to be alined for holding a larger book or a newspaper or any other comparatively wide and flat instrumentality containing reading matter.

It will be obvious that the construction of the supporting medium for the panes of transparent material 17 and 18 may be changed or altered as desired; the means for holding arm 12 so as to permit the movement of the same in substantially all directions; the mechanism for supporting and holding the sleeve 5 and the form and construction of the rod 3 and the base 1 may be changed without in any manner departing from the scope of this invention which consists in the formation of a suitably and substantially supported transparent holder for reading matter to permit the latter to be moved forward and held approximately horizontal over the face of the person while in a reclining position and with the reading matter substantially above or in front of the face with the printed matter thereon exposed to the upward vision of the reader.

I claim:

1. A device for the purpose set forth comprising supporting means, a supporting element formed of a pair of hinged sections, a ball and socket connection between said supporting element and said supporting means, and a pair of vertically-disposed transparent elements mounted in said supporting elements and constituting a support for and further permitting of an inspection there-through of reading matter.

2. A device for the purpose set forth comprising a supporting means, a supporting element formed of a pair of hinged sections, each having a groove in its upper face, a ball and socket connection between one of said sections and said supporting means, and a pair of vertically-disposed transparent elements mounted in said grooves and constituting supports for and further permitting of an inspection there-through of reading matter.

In testimony whereof I have hereunto set my hand in presence of two subscribing witnesses.

MARK D. STEVENSON.

Witnesses:
C. E. HUMPHREY,
A. L. McCLINTOCK.

---

Copies of this patent may be obtained for five cents each, by addressing the "Commissioner of Patents, Washington, D. C."